Patented Sept. 8, 1925.

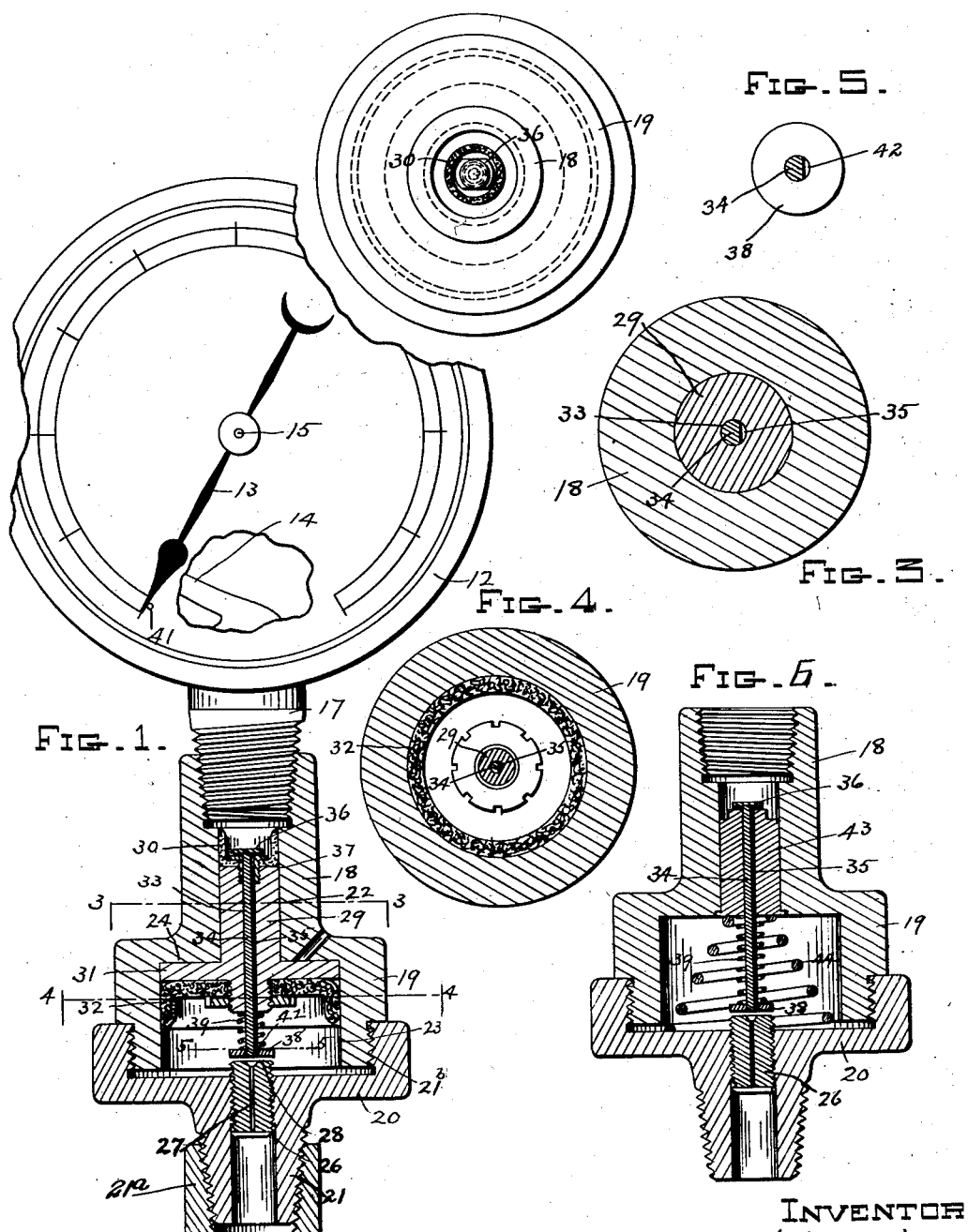

1,552,862

UNITED STATES PATENT OFFICE.

FRANK JOSEPH MANNING, OF MEDFORD, MASSACHUSETTS, ASSIGNOR TO THE MANNING GAUGE CO., INC., OF BOSTON, MASSACHUSETTS, A CORPORATION OF MASSACHUSETTS.

CHECK VALVE FOR PRESSURE GAUGES.

Application filed January 12, 1922. Serial No. 528,711.

*To all whom it may concern:*

Be it known that I, FRANK J. MANNING, a citizen of the United States, residing at Medford, in the county of Middlesex and State of Massachusetts, have invented new and useful Improvements in Check Valves for Pressure Gauges, of which the following is a specification.

This invention relates to a pressure gauge employing a Bourdon tube or spring, and used as an adjunct of a machine or apparatus such as a hydraulic press, which is caused by fluid pressure to perform its function.

When the working pressure is released after an operation, the pressure in the Bourdon tube of the gauge is suddenly released, causing the tube to return to its normal form or position, with a quick spasmodic movement which often has an injurious effect on the tube itself, and on the pointer and the delicate mechanism connecting the free end of the tube with the pointer. In some cases the teeth of the gearing included in said mechanism are broken, and not infrequently the pointer is broken by the severe shock attending its arrest by the usual fixed pin on the dial, which arrests the pointer at zero.

The fluid which operates a hydraulic press is usually subjected to pressure by a reciprocating pump, the action of which causes rapidly succeeding fluctuations of pressure which are imparted to the Bourdon tube, and cause corresponding fluctuations of the pointer, and difficulty in obtaining an accurate reading of the working pressure.

My invention has for its object to provide means for preventing the objectionable results above mentioned, and is embodied in a check valve adapted to be interposed between the Bourdon tube of a pressure gauge and the source of power that actuates the gauge, and characterized as hereinafter described, and pointed out in the claims.

Of the accompanying drawings forming a part of this specification,—

Figure 1 is a sectional view of a check valve embodying the invention connected with a pressure gauge.

Figure 2 is an end view of the check valve.

Figure 3 is a section on an enlarged scale on line 3—3 of Figure 1.

Figure 4 is a section on line 4—4 of Figure 1.

Figure 5 is a section on line 5—5 of Figure 1.

Figure 6 is a sectional view of a modification.

The same reference characters indicate the same parts in all of the figures.

In the drawings, 12 represents the case of a hydraulic pressure gauge, and 13 the hand or pointer which is caused to move over the case dial, by changes of form of the usual arcuate Bourdon tube or spring 14, communicating with a source of supply of a fluid under pressure. Said tube is connected with the pointer arbor 15 by the usual or any suitable mechanism (not shown), the arrangement being such that when the tube is flexed outward by an increase of pressure of the fluid within it, the pointer is moved in one direction, to register the degree of pressure, and when the pressure is reduced, the pointer is moved in the opposite direction, to or toward its initial position, by the return of the spring to its normal form and position. Fluid pressure is admitted to the tube 14 through the usual externally threaded tubular nipple 17 of the case.

The check valve of my invention, in the preferred form shown by Figures 1, 2, 3, and 4, includes a case comprising a tubular neck portion 18, having at one end an internal thread to engage the nipple 17, and at the other end an enlarged body portion 19, the latter being connected to a cap portion 20 having an externally screw-threaded nipple 21, adapted to engage the internal thread of a head member 21ª, of a pipe line or conduit, which communicates with the fluid-containing portion of a hydraulic press or other machine, actuated by fluid pressure, and conducts fluid to and from the gauge, the cap portion 20 and the body portion 19 being separably connected as by a screw-thread connection at 21ᵇ. The fluid-containing portion of the machine, and the pipe line connecting it with the check valve casing, and including the head member 21ª, are hereinafter referred to as the pressure system, of which only the said head member is shown by the drawings.

The neck portion 18 forms the wall of a cylinder 22 of limited diameter, called the smaller cylinder. The body 19 is chambered to form a larger cylinder 23, having an inner head 24, the outer head of said cylinder being formed by the cap portion 20. The larger cylinder 23 is coaxial with the smaller cylinder 22 and communicates therewith. The cap portion 20 is provided with a restricted inlet and outlet formed, as here shown, by a bushing 26, screwed into the central opening and extending into the nipple 21, said bushing having a contracted bore 27, permitting only a restricted flow of fluid in either direction.

The inner end of the bushing projects above the cap portion 20 and forms a stop 28.

Movable in the said cylinders is a double piston composed of a smaller piston member 29, having a sliding fit in the smaller cylinder, and provided with a flexible cup washer 30, and a larger piston member 31, having a sliding fit in the larger cylinder, and provided with a flexible cup washer 32, said pistons being rigidly connected, and preferably integral with each other, as shown by Figure 1. Extending through the double piston is a duct or passage 33, partially occupied by a valve stem 34, which is cut away or flattened at one side to form a restricted passage 35 (Figure 3), adapted to permit a restricted flow of fluid in either direction from cylinder to cylinder.

Fixed to one end of the stem 34 is a valve member 36, adapted to be seated on a valve seat 37, on the piston member 29. Fixed to the opposite end of the stem 34 is a head 38, adapted to contact with the stop 28 formed by the bushing 26. A spring 39 interposed between the head 38, and an abutment on the double piston, normally holds the valve member 36 closed on the seat 37. The arrangement is such that when the double piston is at the upward extreme of its movement, as shown by Figure 1, the head 38 is separated from the stop 28, so that the valve member 36 is held closed by the spring 39. The passage 35 is at all times in communication with the larger cylinder.

The preferred diameter of the smaller cylinder and of the piston member 29 is about a half inch, and the preferred diameter of the larger cylinder and of the piston member 31, is about an inch and one-half.

Operation:

Let it be assumed that the fluid in the system is under a pressure of five thousand pounds. This pressure acts on the piston portion 31 to hold the double piston in the position shown by Figure 1, and acts through the restricted passage 35, to open the valve member 36 against the force of the spring 39, until the same pressure prevails in the upper portion of the smaller cylinder and in the Bourdon tube 14, and causes the gauge to indicate five thousand pounds. The valve member 36 is then closed, and remains closed until an increase of pressure is created in the system, sufficient to open the valve member and cause the pointer to register the increased pressure.

When, with the pressure in the smaller cylinder below that in the system, the pressure in the system is gradually or slowly, and not abruptly, decreased, this pressure acting on the larger area of the piston portion 31 causes the double piston to remain in the position shown. In other words, the pressure in the gauge and in the smaller cylinder above the piston member 29, acting on the relatively small area of the latter, cannot depress the piston, and the valve member 36 remains open until the pressure below the larger piston is sufficiently lowered, as by the discharge of the acting fluid from the system, to be overcome by that on the smaller piston. When this occurs the valve member 36 is immediately closed on the seat 37 by the combined action of the spring 39 and the preponderance of pressure in the Bourdon tube and in the smaller cylinder above the piston member 29, and thus prevents an injuriously sudden release of pressure from the Bourdon tube.

If the pressure confined in the Bourdon tube and above the smaller piston member sufficiently exceeds the pressure in the larger cylinder and below the larger piston member, it will force the double piston downward, thus enlarging the space in which the fluid is confined by the valve member 36, above the piston, this space including the Bourdon tube. This reduction of pressure permits the tube to gently and gradually move the pointer toward its initial position. When the piston has been depressed sufficiently to cause the head 38 to contact with the stop 28, the valve member 36 will be opened, so that the pressure remaining in the Bourdon tube is released through the passage 35, and the tube completes the return of the pointer to its initial position, in which it is arrested by the usual fixed pin 41, on the gauge dial.

The flat side of the stem 34 extends through a circular orifice in the head 38, so that a passage 42 (Figure 5) is provided which registers with the upper end of the duct 27, and permits a slow escape of fluid from the larger cylinder.

I have demonstrated by practical tests that, whereas, without the described check valve, the release of pressure from the pressure system of a hydraulic press often causes serious injury to delicate parts of the mechanism of the pressure gauge, there is no such liability when the check valve is employed, the return of the Bourdon tube and pointer to their initial positions being always gentle and gradual.

The check valve also prevents injurious vibration of the Bourdon tube, the pointer, and other parts of the gauge mechanism, due to sudden fluctuations of pressure in a machine such as a hydraulic press, in which a fluctuating pressure is created by the action of a pump.

When the check valve is not employed, all fluctuations of pressure due to the usual action of the pump extend to and directly affect the Bourdon tube. The pressure momentarily increases during the forward stroke of the pump piston, and decreases during the backward stroke, so that the above-mentioned vibration inevitably occurs. This is prevented by the check valve as follows.

Whenever the pressure in the gauge and above the smaller piston member 29, and that in the system and below the larger piston member 31, are equal, the valve member 36 is closed, as already stated. When the pressure in the system is momentarily reduced by the backward stroke of the pump piston, the valve member 36 remains closed, so that the pressure in the gauge is not reduced, and the pointer does not move in a direction toward zero. The ensuing forward movement of the pump piston and the sudden momentary increase of pressure below the larger piston member 31, caused thereby is prevented by the previously confined pressure in the gauge and above the smaller piston member 29, from opening the valve member 36, and from moving the pointer in the opposite direction to register an increased pressure, there being no increased pressure-registering movement of the pointer unless and until the pressure in the system exceeds that in the gauge. The pointer is, therefore, prevented from vibrating or fluctuating abruptly by fluctuations of pressure due to the movements of the pump piston.

In the modification shown by Figure 7, the larger piston 31 is omitted, and a piston 43 is substituted for the piston member 29, the casing being preferably constructed as already described.

The valve member 36, the stem 34, forming one side of a passage 35, the head 38, and the spring 39, are associated with the piston 43, and the cap portion 20 is provided with the bushing 26. A relatively stiff spring 44 of tapering or volute form is interposed between the head 20 and the piston 43.

The operation of this embodiment of the invention, in preventing an objectionably sudden return of the pointer to zero, is as follows.

A pressure of say five thousand pounds in the larger cylinder acts through the passage 35, to open the valve member 36, so that the same pressure prevails above the piston and in the gauge. While this pressure prevails, the upward pressure of the spring 44, plus the pressure in the larger cylinder, prevents downward movement of the piston, so that the valve member remains open. When the pressure is released from the machine, the valve member 36 is closed by the spring 39, so that the pressure in the gauge and above the piston 43, acts to slowly depress the piston against the force of the spring 44, until the valve member is opened by contact of the head 38 with the stop 28. The pressure of the Bourdon tube is, therefore, gradually, and not abruptly, reduced, and the pointer returns slowly to zero.

It will be seen that each of the illustrated embodiments of the invention includes pressure-controlling means within the check valve casing, said means being responsive to pressure in the system to first balance or equalize the pressure in the tube and in the system, thus causing the gauge pointer to register the pressure, and to then so confine the pressure in the tube, that upon a decrease of pressure in the system, the confined pressure is gradually released from the tube, to prevent injuriously abrupt movements of the latter.

I claim:

1. In combination, a pressure system, a pressure gauge including a Bourdon spring and a holder therefor, and a check valve comprising a casing having means at one end for connection with said system, and at the opposite end for connection with said holder, and pressure-controlling means within said casing responsive to pressure in the system to first balance or equalize the pressure in the tube and in the system, and thereby cause the gauge to register the pressure, and at the same time confine pressure in the tube, said means being responsive also to a decrease of pressure in the system to permit a slow reduction of pressure in the tube, and prevent abrupt movements of the latter, said pressure-controlling means including a spring-pressed valve member, a piston movable with and independently of said valve member, and provided with a valve seat with which said member cooperates, the valve member and the casing being provided with cooperating elements for opening the valve member.

2. In combination, a pressure system, a pressure gauge including a Bourdon spring and a holder therefor, and a check valve comprising a casing having means at one end for connection with said system, and at the opposite end for connection with said holder, and pressure-controlling means within said casing responsive to pressure in the system to first balance or equalize the pressure in the tube and in the system, and thereby cause the gauge to register the pressure, and at the same time confine pressure in the tube, said means being responsive also to a decrease of pressure in the system to permit a slow reduction of pressure in the tube, and prevent abrupt movements of the latter, said pressure-controlling means including a spring-pressed valve member, a piston movable with and independently of said valve member, and provided with a valve seat with which the valve member cooperates, the valve member and the casing being provided with cooperating stop elements for opening the valve member, and with a contracted inlet and outlet passage permitting a slow release of pressure from the casing.

3. A check valve for use with a Bourdon tube pressure gauge, comprising a casing adapted to connect the said tube with a pressure system, and including a smaller cylinder communicating with the tube and a larger cylinder communicating with the smaller cylinder and with the said system, the casing being provided with a member having a restricted inlet and outlet passage communicating with the larger cylinder, and constituting a stop within the larger cylinder, a double piston including a smaller member, movable in the smaller cylinder, and a larger member movable in the larger cylinder, said piston being provided with a restricted longitudinal passage, having a valve seat above the smaller piston member, and a valve member having a stem extending through the piston, and adapted to cooperate with said stop.

In testimony whereof I have affixed my signature.

FRANK JOSEPH MANNING.